United States Patent Office.

LEWIS FORBES, OF SAN FRANCISCO, CALIFORNIA.

HAIR-TONIC.

SPECIFICATION forming part of Letters Patent No. 253,594, dated February 14, 1882.

Application filed November 5, 1881. (No specimens.)

*To all whom it may concern:*

Be it known that I, LEWIS FORBES, of the city and county of San Francisco, State of California, have invented a Hair Producing and Restoring Compound; and I hereby declare the following to be a full, clear, and exact description thereof.

My composition consists of certain ingredients combined in the proportions stated hereinafter.

In order that I may properly designate one of the ingredients and explain its character, I will at once enter upon a description of its preparation.

I take the hide or skin of any hair, fur, or wool producing animal, with its hair, fur, or wool upon it, and, laying it first with its hairy side down, I strip or peel off from the inside the inner layer or skin of fat, and whatever other impurities may be clinging thereto, and throw it away. This leaves the hide clean. Next I turn it over with its hairy side up, and carefully shave off all the hair, fur, or wool, leaving remaining a clean skin or hide devoid of hair or fat, but having within it the roots or germs of that which grew upon the outside and covered the animal, whether hair, fur, or wool. I then take this, thus prepared, and put such quantity as I shall state hereinafter into a certain quantity of condensed or distilled water, and set it upon the fire in a vessel with a tight lid, out of the top of which a coil or worm pipe proceeds, the coil of which is in cold water, for the purpose of distilling the material in the vessel. I have not deemed it necessary to further illustrate this vessel with its distilling-pipe, for it is a common device and the simplest form of a still.

The condensed water and prepared hide in the vessel are subjected to a boiling-heat, and the evaporation therefrom proceeding through the pipe, as described, is condensed, and the liquid thus formed is caught as it flows from the distilling-pipe. It is a pure colorless liquid having a sticky consistency. I then prefer to strain this liquid, though this is not necessary. As soon as it becomes somewhat cool I put a certain quantity of good alcohol with it and add salt, and after thoroughly mixing, the compound is ready for use.

Having now explained generally the ingredients and their manner of preparation and mixing, I am enabled to designate and state the proportions with greater accuracy of expression.

The condensed or distilled water I use is about two (2) gallons; the hide or skin prepared and cleaned as described, four (4) pounds. These two, when distilled as I have described, will yield me of the pure distilled liquid about six (6) quarts. In that case I mix with it of alcohol about two (2) quarts. Into this I put of salt about three (3) ounces. These ingredients are thoroughly mingled by agitation. In this compound I use condensed water simply for its greater purity, as it is required to effect my object. The product of the prepared hides is of course the essential of the compound; but I have found it impossible to use it without the addition of some substance to preserve it from decomposition. If left to itself for a day or two, it would decompose and become offensive. Therefore I add alcohol, which not only preserves it, but also serves to introduce it into the scalp with greater efficacy. It gives to it the required consistency and causes it to penetrate the skin. The salt is added in order to give a healthy tone to the scalp, though it might be omitted. I would prefer, however, always to put it in.

It is obvious that the distilled liquid from the water and hide being the essential part, any addition to effect the purpose for which the alcohol and salt are introduced would be the equivalents of said substances.

The object of the compound is to produce and restore hair, and the application is simply by rubbing well the scalp after first carefully shaving it. This operation is continued until the desired effect is produced.

Having thus described my invention, what I claim as new, and desire to secure by Letters Patent, is—

A hair-restorer consisting of the herein-described distillate of water and animal hides, in combination with alcohol and salt in substantially the proportions named, and for the purpose set forth.

In witness whereof I hereunto set my hand.

LEWIS FORBES.

Witnesses:
WM. F. BOOTH,
S. H. NOURSE.